Dec. 11, 1962 P. F. GOOD 3,067,558
SAUSAGE PACKAGING MACHINE
Filed July 21, 1959 6 Sheets-Sheet 1
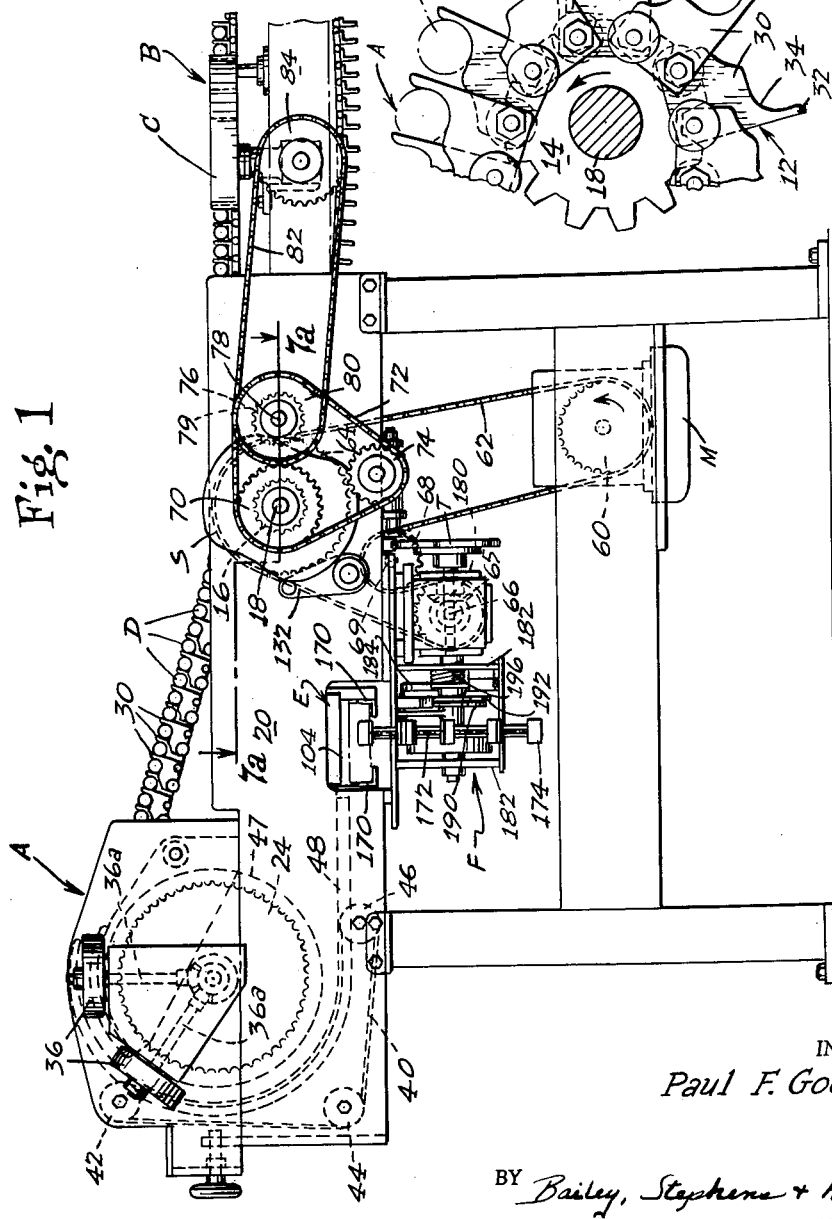
INVENTOR.
Paul F. Good,
BY Bailey, Stephens + Huettig
ATTORNEYS Dec. 11, 1962  P. F. GOOD  3,067,558
SAUSAGE PACKAGING MACHINE
Filed July 21, 1959  6 Sheets-Sheet 2
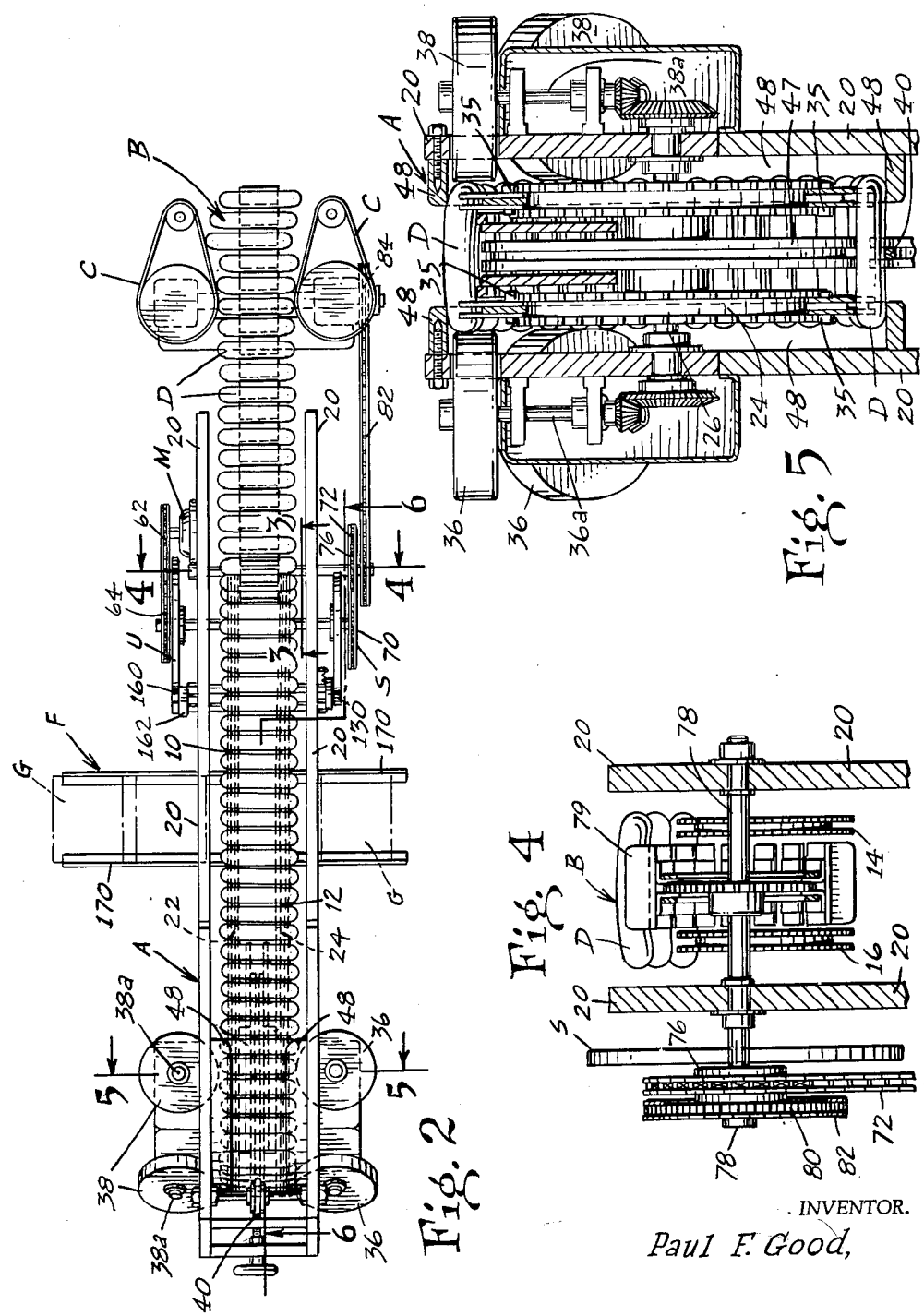
INVENTOR.
Paul F. Good,
BY Bailey, Stephens & Huettig
ATTORNEYS

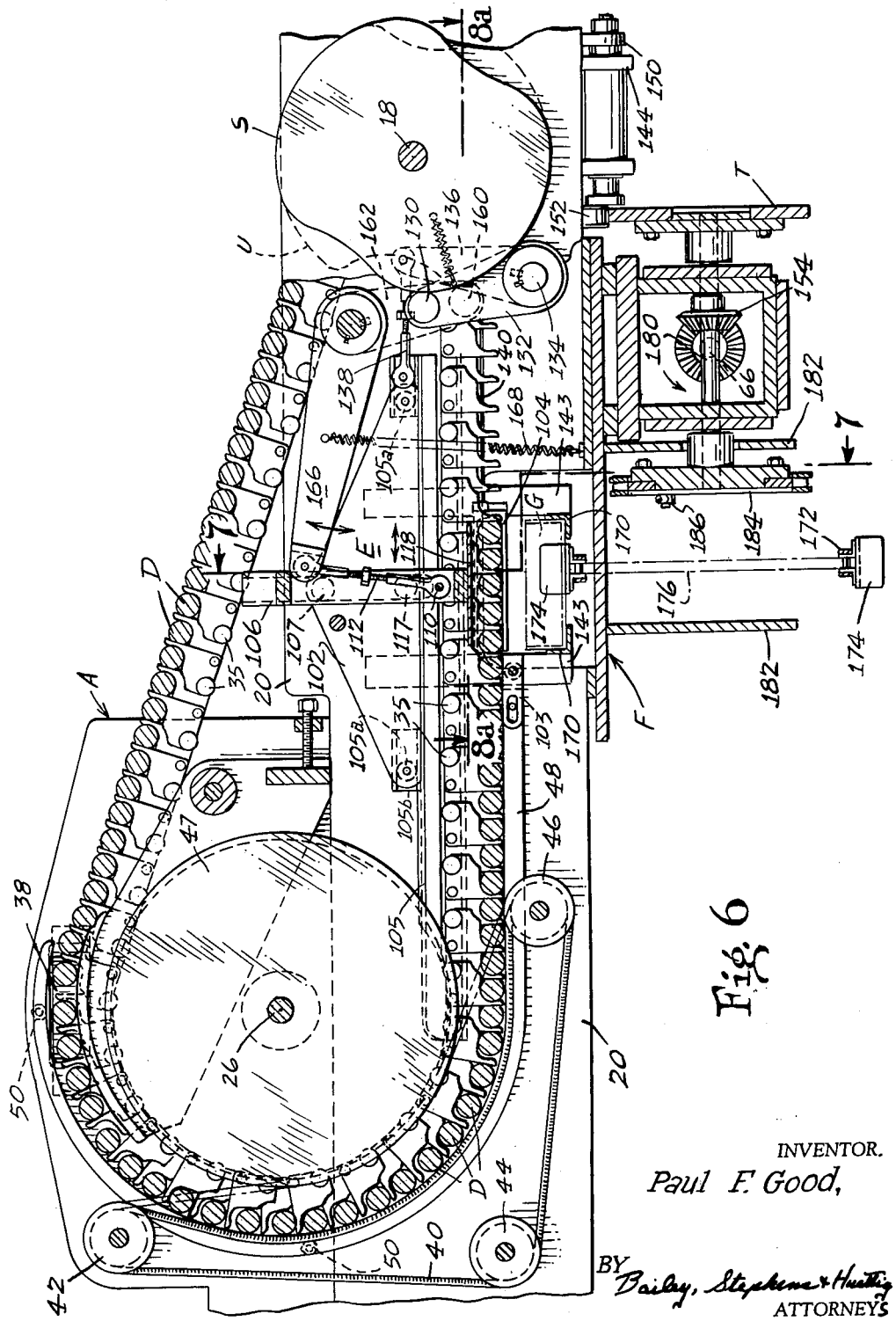

Dec. 11, 1962 P. F. GOOD 3,067,558
SAUSAGE PACKAGING MACHINE
Filed July 21, 1959 6 Sheets-Sheet 4
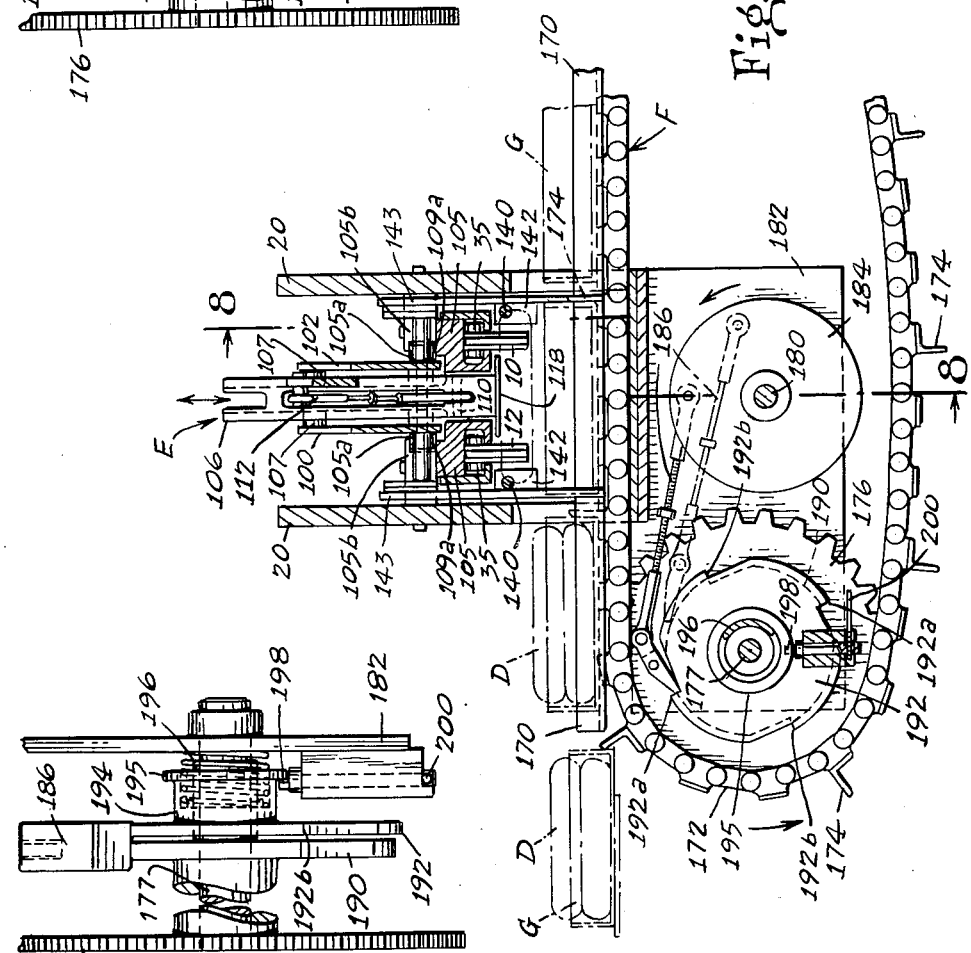
INVENTOR.
Paul F. Good,
BY Bailey, Stephens + Huettig
ATTORNEYS

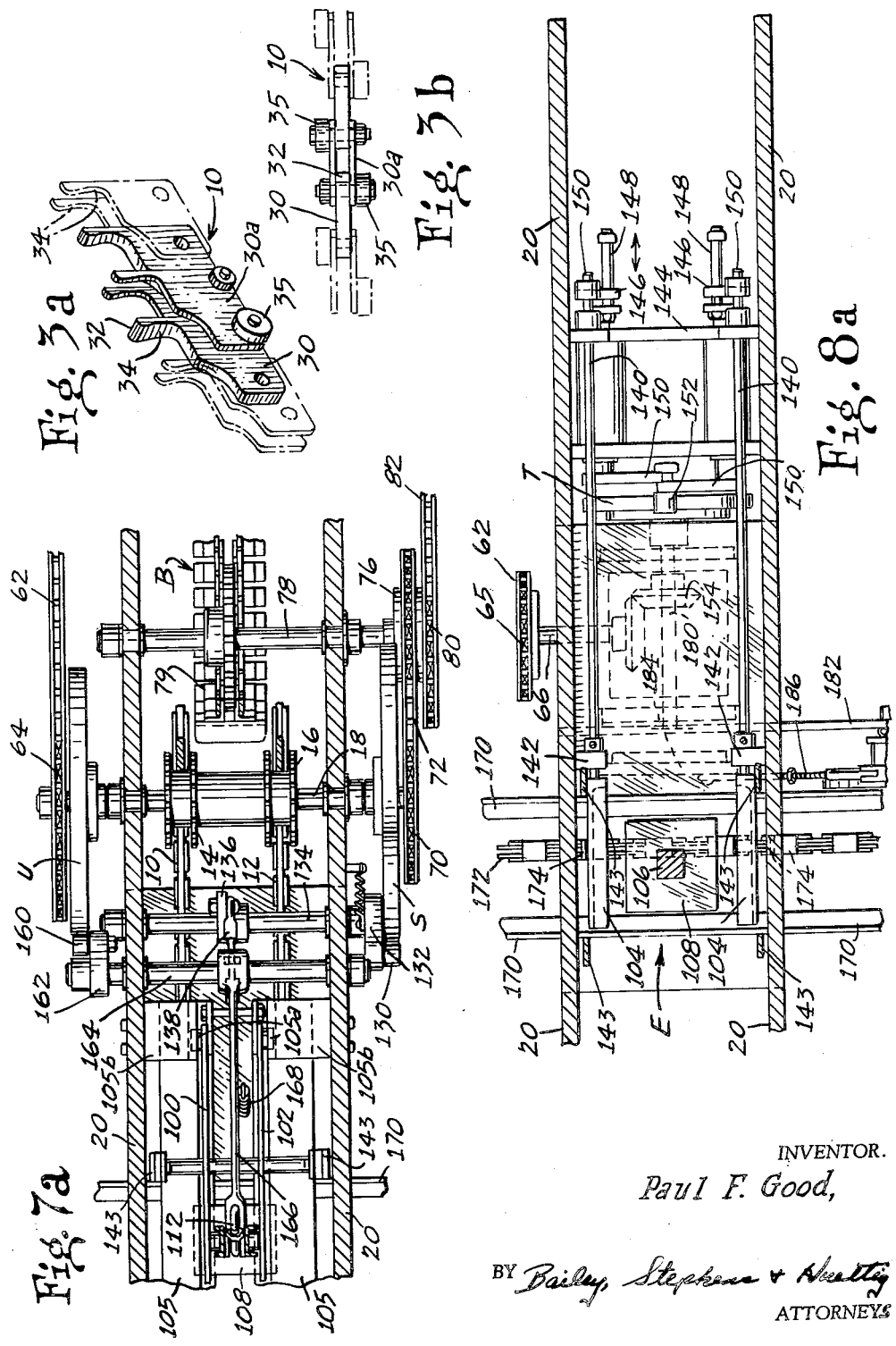

Dec. 11, 1962  P. F. GOOD  3,067,558
SAUSAGE PACKAGING MACHINE
Filed July 21, 1959  6 Sheets-Sheet 6
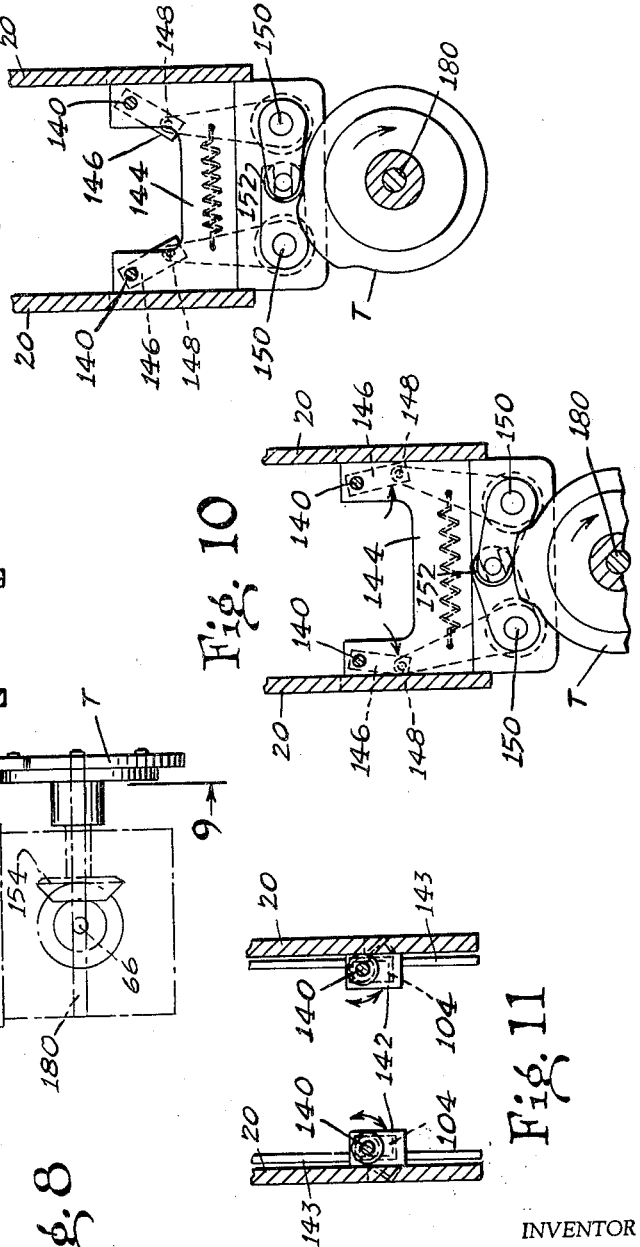
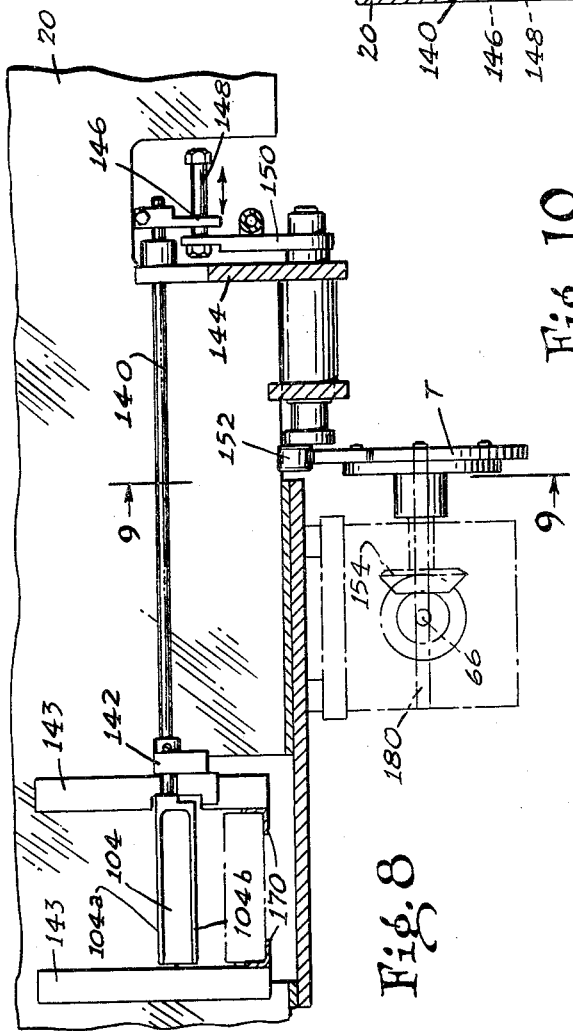
INVENTOR
Paul F. Good,
BY Bailey, Stephens & Huettig
ATTORNEYS

3,067,558
SAUSAGE PACKAGING MACHINE
Paul F. Good, Baltimore, Md., assignor, by mesne assignments, to Speedco, Inc., Baltimore, Md., a corporation of Maryland
Filed July 21, 1959, Ser. No. 828,633
10 Claims. (Cl. 53—252)

This invention relates to a packaging machine. In particular, the invention is directed to a machine for packaging objects such as sausages, for example frankfurters.

Heretofore, the commercial packaging of sausages was done by hand. This is because the individual sausages inherently assume a curved shape during their course of manufacture, and the sausages have to be straightened as they are being packed in rows in a box. A machine handling of the sausages is difficult because the ends of the sausages, called the nubbins, tend to be irregularly shaped due to the fact that the individual sausages in a string of sausages in a sausage casing are separated from each other by tying the casing, and these ends become deformed while the strings of sausages are hung on racks while in storage prior to being packed. The packaging of sausages is made more difficult in the case of skinless frankfurters. Such frankfurters have the sausage casing removed therefrom prior to being packed. The frankfurther is thus formed of small particles of meat which are held together simply by the congealed fat in the frankfurter. The frankfurters are kept solid by being refrigerated to a temperature of about 40° F. Yet, the frankfurters cannot stand rough handling and, in addition, are greasy and rub off fat.

The object of this invention is to produce a mechanism for packaging sausages, particularly skinless frankfurters, with a resultant savings over the cost of packaging by hand.

In general, the objects of the invention are obtained by feeding the frankfurters into a chain composed of rows of spaced fingers which may be opened or closed toward one another. The frankfurters are fed into the open fingers and restrained by the subsequent closing of the fingers as they are brought to a position for being released from the chain and placed in a pan or box. At the releasing position, the frankfurters are pushed from the chain by a plunger into a box immediately below the chain. As the frankfurters have been held reasonably straight and in alignment by the chain, they are in position to enter the box without further manipulation, and thus the box can be packed with one or more superimposed rows, all depending upon the size of the box being used.

The means by which the objects of the invention are obtained are described more fully with reference to the accompanying drawings, in which:

FIGURE 1 is a side view of the packaging machine;
FIGURE 2 is a plan view of FIGURE 1;
FIGURE 3 is an enlarged detail view taken on the line 3—3 of FIGURE 2;
FIGURE 3a is a perspective view of a portion of a conveyor chain;
FIGURE 3b is a plan view of FIGURE 3a;
FIGURE 4 is a cross-sectional view on the line 4—4 of FIGURE 2;
FIGURE 5 is a cross-sectional view on the line 5—5 of FIGURE 2;
FIGURE 6 is a longitudinal cross-sectional view taken on the line 6—6 of FIGURE 2;
FIGURE 7 is a cross-sectional view taken on the line 7—7 of FIGURE 6;
FIGURE 7a is a cross-sectional view taken on the line 7a—7a of FIGURE 1;
FIGURE 8 is a detail view taken generally on the line 8—8 of FIGURE 7;
FIGURE 8a is a plan view generally of FIGURE 8;
FIGURE 9 is a cross-sectional view on the line 9—9 of FIGURE 8;
FIGURE 10 is a view similar to FIGURE 9 but showing the parts in a different position;
FIGURE 11 is a detail view of a part of FIGURE 7;
FIGURE 12 is an enlarged detail of a ratchet mechanism as seen from the left side of FIGURE 7; and
FIGURE 13 is a view similar to FIGURE 12 showing an alternate position of the elements of FIGURE 12.

As shown in FIGURES 1 and 2, the sausage packaging machine A is designed to receive frankfurters or similar articles from a chain conveyor B. This latter conveyor is composed of a series of stainless steel angle pieces having one horizontal and one vertical flange. In practice, the chain is charged with frankfurters D coming from one or more frankfurter skinning machines. The individual frankfurters coming from the skinning machines are directed so that they will fall into open spaces in conveyor B. An operator must attend to see at the discharge end of conveyor B that each space is filled with only one frankfurter. As the conveyor B approaches the machine A, the frankfurters D initially have their ends aligned by means of a pair of endless belts C located on opposite sides of the conveyor B.

In general, the machine A is composed of a pair of endless chains 10 and 12, respectively, which travel around a pair of sprockets 14 and 16 mounted on a shaft 18 and journalled in a frame 20 composed of a pair of spaced metal plates. The other end of the chains travel around a pair of larger sprockets 22 and 24 mounted on a shaft 26 journalled in frame 20. The two similar chains 10 and 12 are therefore driven at the same speed and in constant alignment with each other. Each link 30 and 30a, respectively, of chains 10 and 12, note FIGURES 3, 3a and 3b, is composed of a plate having a straight trailing edge 32 and a leading edge 34 which is curved to approximately the curvature of a frankfurter. Each link 30 is lapped by a pair of outer alternate links 30a with the links being connected by link pins to which are journalled rollers 35 arranged in alternate staggered relationship on opposite sides of the chain. As shown, each link 30 is approximately twice the thickness of one of the links 30a. The spacing between the links is such that, when the links are in a straight reach of the chain, the distance between the trailing edge 32 of one link and the curved edge 34 of a following link is equal to or slightly less than the diameter of a frankfurter.

As conveyor B turns over its sprocket at its discharge end, the space between the angle pieces increases over the arc so that the frankfurter pieces D will roll forward and be free for removal. At the same time, the fingers formed by the links 30 and 30a of the conveyor A travel upwardly around the arc of sprockets 14 and 16 and the distance between the outer ends of adjacent links increases. Conveyors A and B are driven at the same speed and are so aligned that a frankfurter D rolling from conveyor B will be picked up on the curved surface 34 of a link on conveyor A and raised upwardly with the distance between adjacent links gradually closing. When the chain carrying the frankfurters takes its straight reach, the frankfurter will be rather snugly restrained between two adjacent links.

As the raw frankfurters are charged onto conveyor B, they tend to, in most instances, assume a position in which they lie with their curvature at the bottom of a circle or in other words with their nubbins pointed upwardly, but this is not always the case. The aligning belts C also serve to urge the nubbins to turn to a rest position with the nubbins pointed upwardly. All of the frankfurters are not of the same size, with their diameters varying ±1/16 of an inch. Moreover, the nubbins are often quite irregular. Nevertheless, the frankfurters D are in substantial alignment as each is placed upon a pair of fingers upon conveyor A and at that point are permitted a further slight movement, so that as they are carried by conveyor A, the nubbins are substantially pointed upwardly.

As chains 10 and 12 ride over larger sprockets 22 and 24, the sausages are further aligned endwise, if necessary, by a pair of wheels 36 on one side of the chains and a similar pair of wheels 38 on the opposite side of the chains. Each pair of wheels is mounted on its respective shaft 36a and 38a, which wheels are rotated, as hereinafter described, with a peripheral speed equal to the speed of the chain so that the wheels will not rub off any of the particles of meat in the frankfurters.

In passing around sprockets 22 and 24, the links 30 open and would drop the frankfurters unless the latter were restrained. To prevent the dropping, an endless spring belt 40, note FIGURE 6, in the middle of the frame 20 is passed around three sheaves 42, 44 and 46 journalled to frame 20 and being held in contact with the frankfurters over the vertical side end and bottom portions of the sprockets. A guide wheel 47 mounted centrally of shaft 26 limits inward movement of spring belt 40 when there are no frankfurters to be contacted as at the starting of the machine. In order to further hold and guide the ends of the frankfurters, a pair of guide rails 48 is mounted on either side of spring belt 40, the rails being respectively secured by bolts 50 to the plates forming frame 20. These rails 48 extend from above the top of sprockets 22 and 24 around the sprockets to the bottom thereof and are continued as a tangent beyond the sprockets up to adjacent the stripper mechanism used for extracting the frankfurters from the chain and placing them in a box.

The drive for chains 10 and 12 and chain conveyor B is taken from the motor M, FIGURE 1, mounted on the machine frame and having a sprocket 60 for driving a sprocket chain 62. This chain extends upwardly around the sprocket 64 fixed to shaft 18, and then downwardly around a sprocket 65 fixed to a shaft 66 journalled in the machine frame, and then around idler sprocket 68 joined to shaft 69 and back to sprocket 60. Shaft 18 also has a sprocket 70 fixed thereto on the opposite side of frame 20, FIGURE 7a, and around which passes a sprocket chain 72 which is continued over an idler sprocket 74 and upwardly over a sprocket 76 fixed to a shaft 78 which is journalled in frame 20. Conveyor chain B is engaged by sprocket 79 fixed to shaft 78 and driven thereby. A second sprocket wheel 80 is also mounted on shaft 78 and around which passes a sprocket chain 82 for driving sprocket 84 from which, through suitable gearing, guide belts C are driven.

The frankfurters held in chains 10 and 12 are disengaged from the chains and placed in boxes by the stripper mechanism E, note FIGURE 7. The boxes to be filled are placed on a feeding mechanism F, FIGURE 2, extending transversely from the chains 10 and 12 and are advanced one by one into the stripper mechanism E. This stripper mechanism is a movable carriage ecomposed of two parallel triangular plates 100 and 102 beneath which pass chains 10 and 12.

The frankfurters being held in the chain pass beyond the ends of the supporting rails 48, and the frankfurters must be temporarily restrained from accidental displacement pending the time they are removed from the chain. The removablbe carriage is connected to rails 48 by a pair of rail extensions 103, FIGURE 6, fastened by vertical bars 143 to triangular plates 100 and 102, respectively, and being slotted so as to be slidably bolted to each rail 48. Within the carriage are a pair of pivotal gates 104, each having an upper flange 104a and a lower flange 104b in alignment with the ends of the frankfurters D being carried by the chains 10 and 12.

Secured to frame 20 are a pair of rails 105, each having a downward and flanged channel forming a track for rollers 35 of chains 10 and 12, respectively. The upper sides of these rails from bearing surfaces for rollers 105a fastened to the ends of plates 100 and 102. Blocks 105b bolted to frame 20 have a horizontal flange which forms an upper guide rail for rollers 105a.

The stripper is composed of a vertical member 106 longitudinally slotted and having oppositely directed channel-shaped sides which engage two pairs of guide rollers 107 and 117 secured to triangular plates 100 and 102. Member 106 has a plate 108 secured to its lower end and extending between chains 10 and 12 for pushing frankfurters from the chains and into a box upon the opening of gates 104. A pin 110 in member 106 pivotally connects the lower end and arm 112 which is adjustable as to length. The upper end of arm 112 is joined to rocker arm 166 in order to give a vertical reciprocation to member 106.

Three actions must take place in order to transfer the frankfurters D from conveyor A into boxes G placed beneath stripper plate 108. First, as chains 10 and 12 move continuously, the stripper carriage and plate 108 must move along with chains 10 and 12 until the frankfurters are discharged from the chains and then the carriage must be moved back to starting position. Second, gates 104 must be opened to release the frankfurters, and third, member 106 must be actuated to clear the frankfurters from the chains with a positive thrust so as to deposit the frankfurters in a box. The following mechanisms accomplish these functions in order.

Cam S, FIGURES 6 and 7a, is joined to shaft 18. Cam follower 130 is mounted on arm 132 which is keyed to rocker shaft 134 journalled in frame 20. Arm 136 has one end fixed to the middle of shaft 134 and its free end joined to a push-pull rod 138 connected to triangular plates 100 and 102. The shape of the surface of cam S is such as to draw the carriage forwardly at approximately the speed of chains 10 and 12 during the stripper operation, and then give the carriage a quick return.

Each gate 104, FIGURES 6 and 10, is secured to a shaft 140 journalled adjacent plate 108 in blocks 142 secured to vertical members 143 secured to the stripper carriage and in partition 144 adjacent the opposite end of the shafts. A lever 146 is secured to shaft 140 and is slidably mounted on a shaft 148 for permitting gates 104 to reciprocate with the movement of the stripper carriage. Shaft 148 forms one end of a crank 150 journalled in partition 144, the opposite end of the crank terminating in a cam follower 152. As shown in FIGURES 9 and 10, follower 152 is common to each of the two cranks 150 and rests on cam T. The shape of this cam is such as to quickly snap the gates open and shut so that frankfurters can be released without slowing or stopping chains 10 and 12. Cam T is turned through a shaft 180 and a bevel gear 154 connected to shaft 180.

To actuate stripper member 106, a cam U is fixed to shaft 18. Cam follower 160 bearing on cam U is joined to arm 162 fixed to rocker shaft 164 which is journalled in frame 20. Lever 166 is splined to the middle of shaft 164 and extends to a bifurcated end pivotally connected to arm 112. A tension spring 168 connected between lever 166 and the base of frame 20 pulls lever 166 downwardly so that tht lever is lifted only by the action of cam U. The surface of cam U is such as to release lever 166 as gates 104 are opened, thus thrusting arm 112 with member 106 and thrust plate 108 downwardly to clear frankfurters from chains 10 and 12.

A box feed mechanism F extending transversely of frame 20, is synchronized with the opening of gates 104 for having a box beneath stripper plate 108, as shown in FIGURES 1, 6, 7, 8a, 12 and 13. A pair of spaced angle rails 170 are hung from vertical bars 143 which serve as tracks for boxes placed on the rails by manual or automatic means. Beneath the rails is a conveyor chain 172 having pusher plates 174 attached thereto. Driving sprocket 176 for chain 172, which is held by shaft 177, must be moved intermittently to position a box beneath stripper plate 108 and hold the box stationary while the box is being filled, and then move the filled box away from stripper mechanism E. The length of time the box is held stationary is controlled by the ratcheting mechanism and can be selectively fixed for loading either a single layer of frankfurters or a double layer into the box.

Shaft 180 extends through a pair of plates 182 hung from the base of frame 20, shaft 180 being connected to bevel gear 154 and being an extension of shaft 180 of cam T. The other end of shaft 180 drives a wheel 184 to which a pawl arm 186 is eccentrically attached. Shaft 177, upon which is mounted drive sprocket 176, has keyed thereto a first ratchet 190 and a second ratchet 192 fixed to a sleeve 194 having a collar 195 and which is slidable and freely rotatable upon shaft 177 and urged toward ratchet 190 by a compression spring 196 extending between ratchet 192 and plate 182. Mounted on plate 182 below sleeve 194 is a cam 198 engaging collar 195 and turnable by handle 200.

Ratchet 190 is notched to form four teeth equally spaced around its circumference. The spacing of the teeth is such that one rotation of shaft 180 thrusts pawl arm 186 to index ratchet 190 one tooth, which moves conveyor chain 172 one box length in between a first and a second downward stroke of stripper plate 108. Thus, note FIGURE 12, when cam 198 is turned to move ratchet 192 to the right and out of engagement with pawl 186, only ratchet 190 is actuated and each box G receives a single layer of frankfurters.

Ratchet 192 is used together with ratchet 190, FIGURE 13, to place two layers of frankfurters in a box by turning cam 198 so that spring 196 pushes ratchet 192 to the left. Ratchet 192 is of greater diameter than ratchet 190 and also has notches forming four equally spaced teeth. Two diametrically opposed notches 192a are of such a depth that they match the notches in ratchet wheel 190. However, the other two notches 192b on ratchet wheel 192 are shallower than the outside diameter of the ratchet wheel 190. Therefore, when a notch 192a is aligned with a notch on ratchet 190, pawl 186 will engage both notches and index ratchet 190 and conveyor chain 172. On the next stroke of pawl 186, only notch 192b is engaged and ratchet 190 is untouched, so that only ratchet 192 is indexed. Ratchet 190 is unmoved as sleeve 194 is not fixed to shaft 177. Conveyor chain 172 remains stationary during two strokes of stripper plate 108, and two layers of frankfurters are placed in a single box. On the next stroke of pawl 186, a notch 192a is aligned with a notch in ratchet 190, so that ratchet 190 is then indexed.

The entire apparatus is synchronized from the motor M. Individual sausages D transferred from conveyor B to chains 10 and 12 of machine A are placed in alignment and held, in the embodiment shown in the drawings, in rows of five sausages in the stripper E. Thus box feed mechanism F receives five sausages at a time as a layer in each box G, with one or a plurality of layers being selectively placed in each box.

Having now described the means by which the objects of the invention are obtained,

I claim:

1. A sausage packaging machine comprising a substantially horizontal endless chain conveyor having an upper reach for receiving individual sausages and for conveying said sausages to and along the lower reach of the conveyor with the sausages parallel to each other and with their ends substantially aligned, box means beneath said lower reach for receiving a discrete group of sausages from said lower reach, and means for releasing a discrete group of sausages from said lower reach above said box means and in synchronization with said chain conveyor to discharge said discrete group from said lower reach and into a box positioned vertically beneath said lower reach.

2. A sausage packaging machine as in claim 1, said releasing means comprising a stripper including a vertically reciprocating stripper plate positioned above said lower reach and box means, and stripper cam means actuated in synchronism with said chain conveyor for reciprocating said stripper plate.

3. A sausage packaging machine as in claim 2, said stripper further including gate means positioned adjacent said stripper plate for holding the ends of sausages while being moved by said chain conveyor, and gate cam means synchronized with said stripper cam means for opening said gate means to release the sausages as said stripper plate is moved to contact the sausages.

4. A sausage packaging machine as in claim 3, said chain conveyor comprising a pair of spaced parallel endless chains composed of links each of which is extended into a finger with the distance between two adjacent fingers being substantially equal to the diameter of a sausage.

5. A sausage packaging machine as in claim 4, further comprising carriage means for supporting said stripper, and carriage cam means for reciprocating said carriage means at substantially the same speed as said conveyor chains in the direction of the movement of said chains.

6. A sausage packaging machine as in claim 5, the endless chains in said pair of chains, respectively, lying in a vertical plane, a track extending along said lower reach and forming a guideway for said links, and said carriage means being slidably supported upon said track.

7. A sausage packaging machine as in claim 1, said box means comprising a box conveyor chain, and gear means for driving said box conveyor chain from said chain conveyor.

8. A sausage packaging machine as in claim 7, further comprising indexing means coupled to said gear means for intermittently moving said box conveyor chain.

9. A sausage packaging machine as in claim 8, said indexing means comprising a first pawl and ratchet with said ratchet having notches spaced to index said box chain one box conveyor length upon each stroke of said pawl.

10. A sausage packaging machine as in claim 9, further comprising a second ratchet concentric with and freely rotatable with respect to said first ratchet and of greater diameter than said first ratchet, and at least one notch in said second ratchet co-extensive with a notch in said first ratchet whereby said first ratchet is indexed only upon a plurality of strokes of said pawl.

References Cited in the file of this patent

UNITED STATES PATENTS

| | | |
|---|---|---|
| 1,122,641 | Smith | Dec. 29, 1914 |
| 1,906,098 | Pullen et al. | Apr. 25, 1933 |
| 2,019,080 | Johnson et al. | Oct. 29, 1935 |
| 2,048,281 | Muller | July 21, 1936 |
| 2,864,216 | Long et al. | Dec. 16, 1958 |
| 2,909,016 | Sherrill | Oct. 20, 1959 |